(12) United States Patent
Huelke et al.

(10) Patent No.: US 8,960,762 B2
(45) Date of Patent: Feb. 24, 2015

(54) VEHICLE VISOR ASSEMBLY WITH A CENTER CHECK CLIP

(71) Applicant: Ford Global Technologies, LLC, Dearborn, MI (US)

(72) Inventors: David Huelke, Milan, MI (US); Phil Joseph Linson, Commerce Township, MI (US); Jim Allen Stec, Brownstown, MI (US); Justin Lee Healy, Canton, MI (US); Jeff Todd Baxter, Carleton, MI (US); John Andrew Stakoe, Bloomfield Hills, MI (US); Alexander V. Deych, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/183,055

(22) Filed: Feb. 18, 2014

(65) Prior Publication Data

US 2014/0159416 A1    Jun. 12, 2014

Related U.S. Application Data

(63) Continuation-in-part of application No. 13/551,445, filed on Jul. 17, 2012, now Pat. No. 8,678,468.

(51) Int. Cl.
*B60J 3/02* (2006.01)

(52) U.S. Cl.
CPC ........................................ *B60J 3/023* (2013.01)
USPC ............................ 296/97.5; 296/97.9; 40/643

(58) Field of Classification Search
USPC ........ 296/97.1, 97.5, 97.9, 97.12, 97.13, 214; 296/1.02; 248/230.7; 40/643, 644, 593
See application file for complete search history.

(56) References Cited

U.S. PATENT DOCUMENTS

| 4,346,866 | A |   | 8/1982  | O'Hara          |         |
|-----------|---|---|---------|-----------------|---------|
| 5,238,163 | A |   | 8/1993  | Leach et al.    |         |
| 5,316,362 | A |   | 5/1994  | McGuinness      |         |
| 5,411,310 | A | * | 5/1995  | Viertel et al.  | 296/97.9 |
| 5,507,545 | A |   | 4/1996  | Krysiak         |         |
| 5,538,311 | A |   | 7/1996  | Fusco et al.    |         |
| 5,727,837 | A |   | 3/1998  | Viertel         |         |
| 5,931,525 | A | * | 8/1999  | Rickabus        | 296/214 |
| 5,947,545 | A |   | 9/1999  | Akagi et al.    |         |
| 5,975,476 | A |   | 11/1999 | Mancinelli      |         |

(Continued)

FOREIGN PATENT DOCUMENTS

| JP | 2003165333 A | 6/2003 |
| JP | 2003205738 A | 7/2003 |
| JP | 2003237480 A | 8/2003 |

*Primary Examiner* — Jason S Morrow
(74) *Attorney, Agent, or Firm* — Vichit Chea; Price Heneveld LLP

(57) ABSTRACT

A check assembly for a visor assembly of a vehicle is coupled with a headliner of a vehicle roof near a center portion of the vehicle, away from the vehicle door or windows. A clip on the check assembly is adapted to secure small lightweight items and deter such items from being exposed to weather or wind conditions near vehicle door windows, a vehicle sunroof, or an exposed top. The visor portion may engage a clasp on the check assembly and operate between deployed and non-deployed positions, whereby the clip of the check assembly may be concealed in the non-deployed position. According to one embodiment, the check assembly includes a resilient clip protruding rearward from a body portion thereof over a depressed area on the headliner for holding a lightweight item therebetween.

20 Claims, 10 Drawing Sheets

(56) References Cited

U.S. PATENT DOCUMENTS

| | | |
|---|---|---|
| 6,484,365 B1 | 11/2002 | Thompson |
| 7,438,341 B1 * | 10/2008 | Olson, Jr. .................... 296/97.9 |
| 7,543,880 B2 | 6/2009 | Wieczorek et al. |
| 7,686,373 B1 | 3/2010 | McCabe et al. |
| 8,678,468 B2 * | 3/2014 | Huelke et al. ................ 296/97.5 |
| 2001/0007394 A1 | 7/2001 | Beaver |
| 2002/0017800 A1 | 2/2002 | Ichikawa et al. |
| 2004/0118885 A1 | 6/2004 | Turner |
| 2007/0018476 A1 | 1/2007 | Pallmer |
| 2008/0054670 A1 | 3/2008 | Foster et al. |

* cited by examiner

VEHICLE VISOR ASSEMBLY WITH A CENTER CHECK CLIP

CROSS-REFERENCE TO RELATED APPLICATIONS

This application is a continuation-in-part of U.S. patent application Ser. No. 13/551,445, filed on Jul. 17, 2012, entitled "VEHICLE VISOR ASSEMBLY WITH A CENTER CHECK CLIP." The aforementioned related application is hereby incorporated by reference.

FIELD OF THE INVENTION

The present invention generally relates to visor assemblies for vehicles and, more specifically, visor assemblies that incorporate item holding devices.

BACKGROUND OF THE INVENTION

It is generally known to adapt a visor assembly to a portion of a vehicle frame above the vehicle's front windshield. Further, such visor assemblies are adapted to block light rays, such as UV rays or other vehicle headlight rays, from reflecting against a driver or passenger's field of vision.

SUMMARY OF THE INVENTION

According to one aspect of the present invention, a visor assembly includes a support member pivotally supporting a visor and a headliner having a depressed area on an interior surface thereof. A check assembly of the visor assembly provides a body portion coupled with the headliner and a clasp protruding downward from the body portion for removably engaging the visor. The check assembly also includes a resilient clip protruding rearward from the body portion over the depressed area for holding a lightweight item therebetween.

According to another aspect of the present invention, a visor assembly includes a support member pivotally supporting a visor and a recessed surface on a central region of a headliner defining opposing raised edges. A check assembly of the visor assembly provides a body portion coupled with the headliner and a clasp protruding from the body portion for removably engaging the visor. The check assembly further provides a clip protruding from a rearward section of the body portion between the opposing raised edges for holding a lightweight item therebetween.

According to yet another aspect of the present invention, a check assembly for a visor pivotally coupled with an outside region of a headliner includes a body portion coupled with an inside region of the headliner. The check assembly also provides a clasp protruding downward from the body portion in a hook shape that defines a channel facing rearward for removably engaging the visor. Further, the check assembly includes a resilient clip protruding rearward from the body portion and angling toward the headliner for holding a lightweight item therebetween.

According to another aspect of the present invention, a check assembly of a visor assembly for a vehicle is fixedly coupled with a headliner of the vehicle near a center portion of the vehicle, away from the vehicle's doors or windows. A visor portion of the visor assembly is removably engageable with a clasp of the check assembly, and when engaged is pivotal between deployed and non-deployed positions, whereby a clip on the check assembly may be concealed in the non-deployed position. The clip on the check assembly portion is adapted to secure small lightweight items near the headliner in the center portion of the vehicle, preventing such items from being exposed to weather or air flow conditions near the doors and the open windows. The visor portion may also be disengaged from clasp of the check assembly to pivot to a side position along a top of the door without disrupting the items secured near the headliner with the clip.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
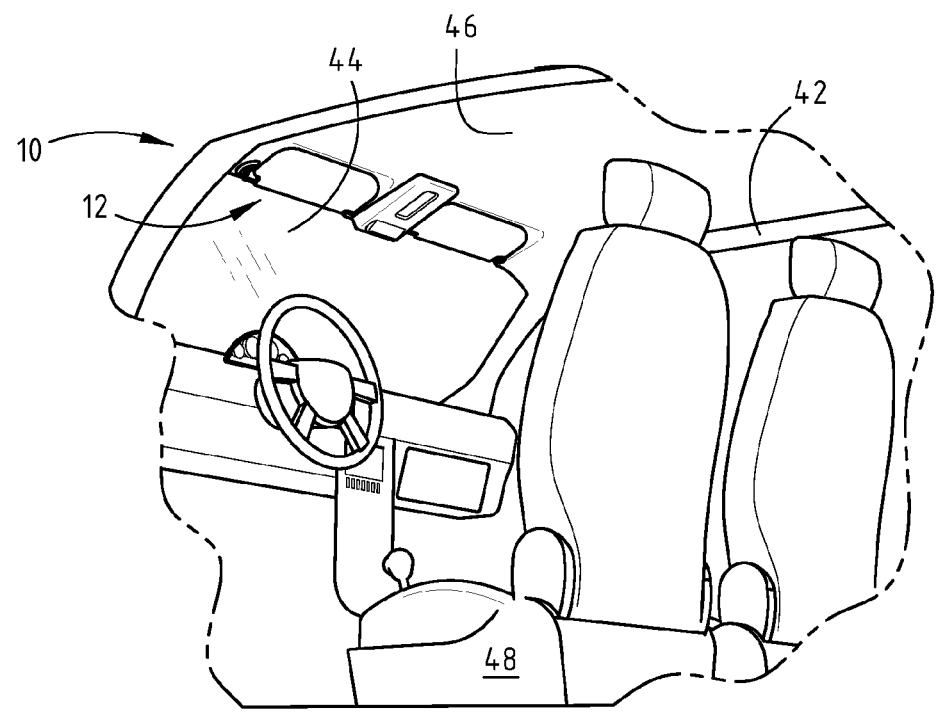
FIG. 1 is a side perspective view of a vehicle of the present invention with a door in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-15, reference numeral 10 generally designates a vehicle having a visor assembly 12. The visor assembly 12 includes an elongated support member 14 that has a pivot end 16, an intermediate portion 18, and a securing end 20. The pivot end 16 pivotally couples with a headliner 22 of a vehicle 10. A visor 24 is coupled with the elongated support member 14, such that the intermediate portion 18 of the elongated support member 14 extends within an edge portion 26 of the visor 24. The visor 24 is operable between a deployed position 28 and a non-deployed position 30. The visor assembly 12 also includes check assembly 32 that has a bracket 34 coupled with the headliner 22 of the vehicle 10. The bracket 34 also has a clasp 36 that removably engages the securing end 20 of the elongated support member 14. A clip 38 is disposed on the bracket 34, which is adapted to hold a small, lightweight item 40. The clip 38 is concealed between the visor 24 and the headliner 22 when the visor 24 is in the non-deployed position 30.

As illustrated in FIG. 1, the visor assembly 12 is typically positioned on the headliner 22 of an interior frame 42 of the vehicle 10, which is located above a front windshield 44 along a front edge of a roof 46 of the vehicle 10. However, the visor assembly 12 is contemplated to be in other orientations and disposed at alternative positions within a vehicle. A user of the visor assembly 12 is typically seated in a front occupant seat 48 within the vehicle 10.

Figure 2:
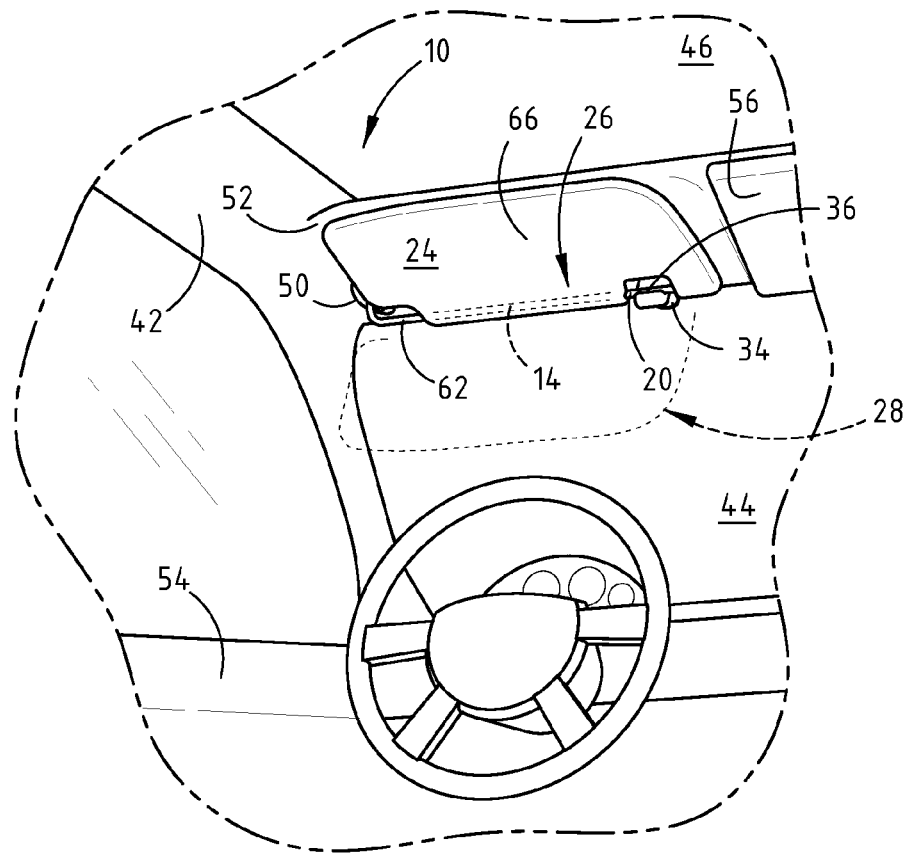
FIG. 2 is a front perspective view of a driver's side compartment showing a vehicle headliner and a visor assembly of the present invention in the non-deployed position.
Figure 3:
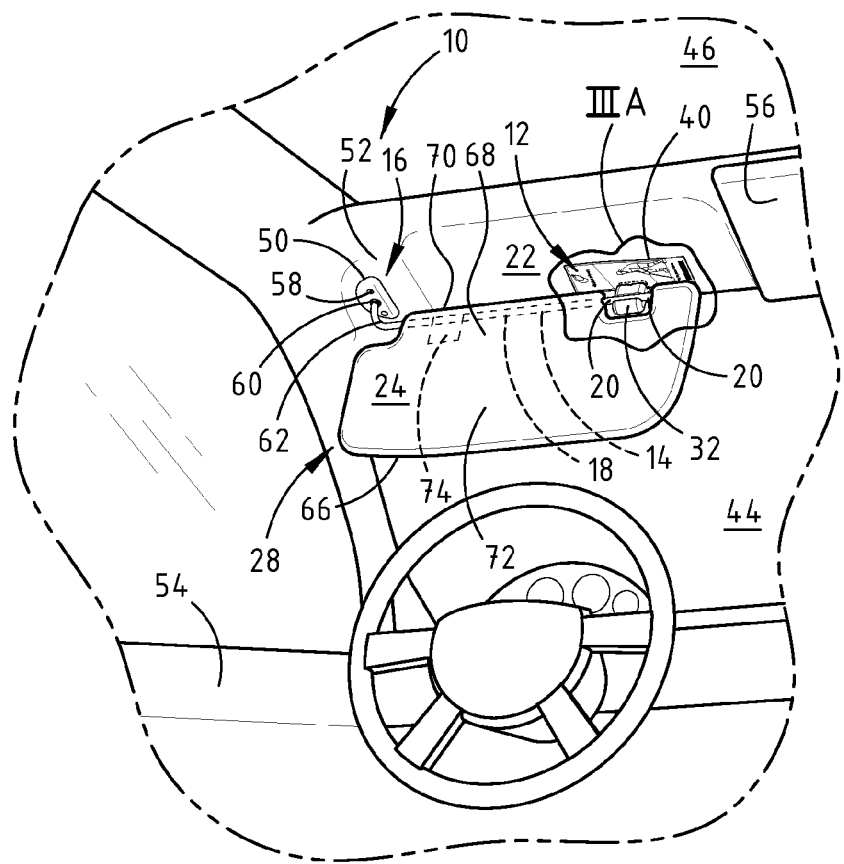
FIG. 3 is a front perspective view of a driver's side compartment showing a vehicle headliner and a visor assembly of the present invention in the deployed position.
Figure 3A:
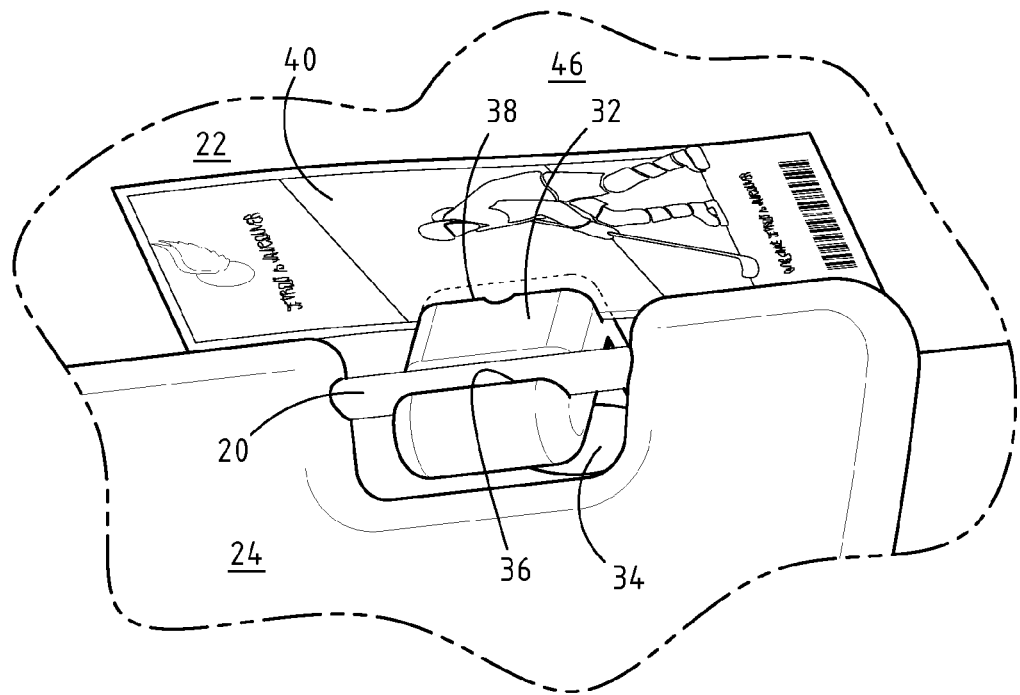
FIG. 3A is a front enlarged partial perspective view of the visor assembly of area IIIA of FIG. 3, marked as IIIA.
Figure 4:
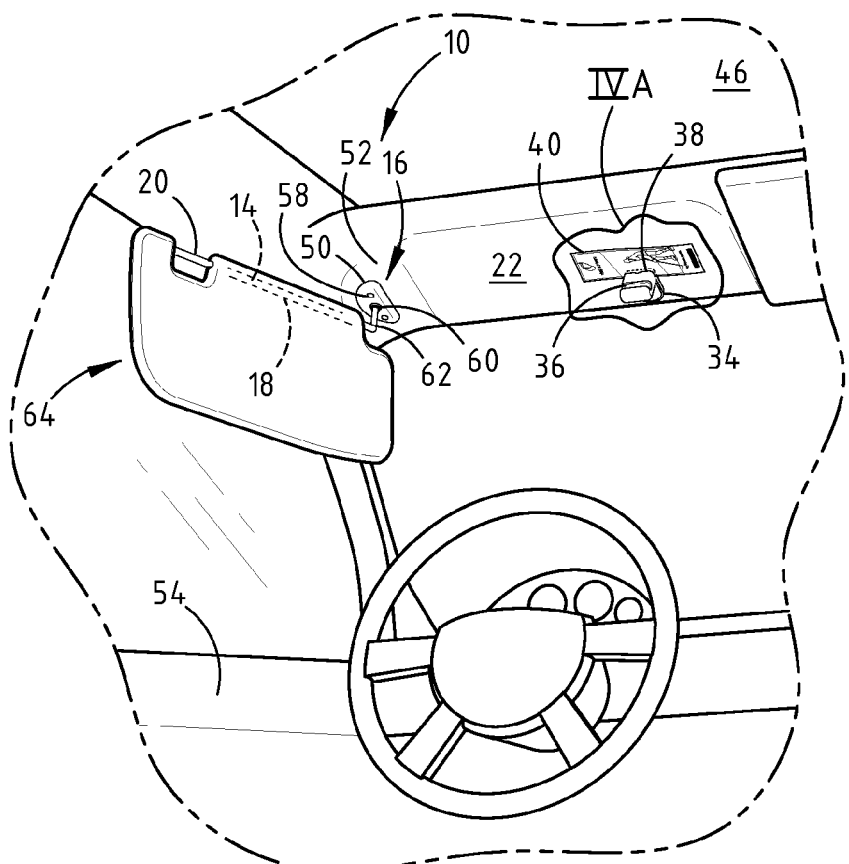
FIG. 4 is a front perspective view of a driver's side compartment showing a vehicle headliner and a visor assembly of the present invention in the deployed position and detached from the check assembly.
Figure 4A:
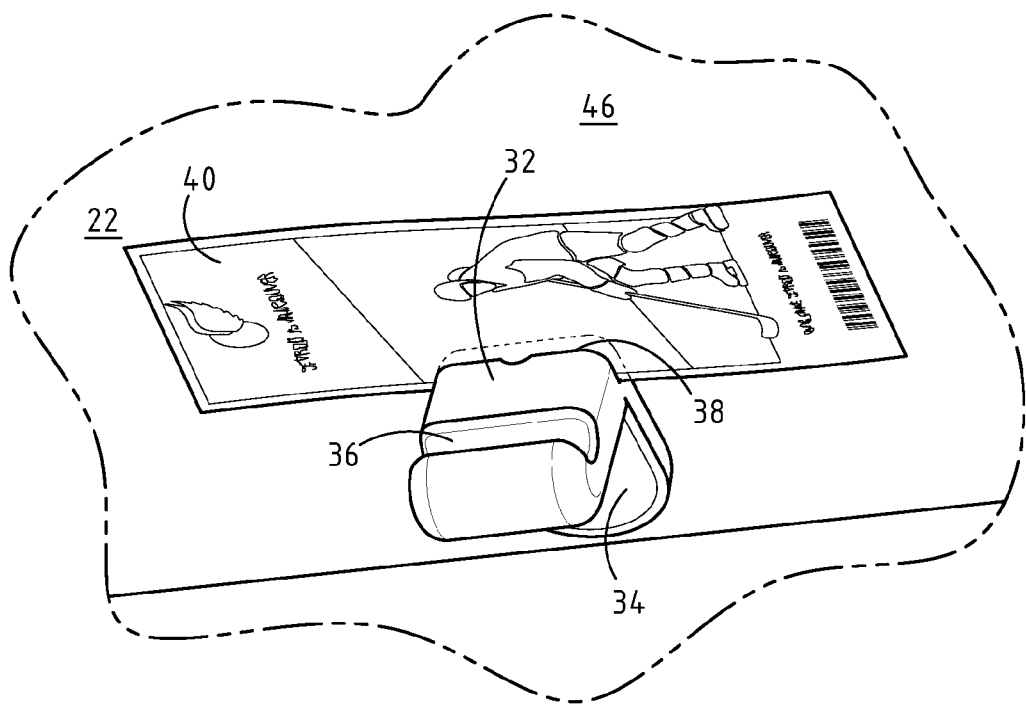
FIG. 4A is a front enlarged partial perspective view of the visor assembly of area IVA of FIG. 4.

Referring now to FIGS. 2-4A, the elongated support member 14 includes the pivot end 16, the intermediate portion 18, and the securing end 20. The pivot end 16 pivotally couples with the headliner 22 of the vehicle 10. More specifically, the pivot end 16 has a mounting bracket 50 that is fixedly coupled with an outside portion 52 of the headliner 22. The outside portion of the headliner 22 is defined by the portion of the headliner 22 near a side door 54, away from a general center 56 of the vehicle 10. The mounting bracket 50 is fixedly secured using at least one mounting fastener 58, such as a screw or bolt. The mounting bracket 50 has a socket 60 formed therein. The pivot end 16 of the elongated support member 14 includes a pivoting rod 62 that engages the socket 60 of the mounting bracket 50, allowing for pivotal movement therein. The socket 60 is adapted to allow for pivotal movement of the pivot rod 62, wherein the pivot rod 62 may be pivoted and frictionally held in various locations by the socket 60. For example, the pivot rod 62 may be moved to a side position 64, as illustrated in FIG. 4, wherein the visor assembly 12 is in the deployed position 28 and the visor 24 is detached from the check assembly 32. The pivot rod 62, in the illustrated embodiment, is an integral piece of the elongated support member 14 and extends to the intermediate portion 18 thereof. However, it is contemplated that in an alternate arrangement the pivot rod 62 may be a separate piece, and further that the pivot end 16 may pivotally couple with the headliner 22.

As shown in FIG. 3, the visor 24 of the visor assembly 12 is coupled with the elongated support member 14 about the intermediate portion 18 thereof. The visor 24 has a substantially flat rectangular shaped body 66, having a thickness between 1 mm-30 mm and a substantially opaque material. The visor 24 also has an edge portion 68 defined by a long edge of the rectangular shaped body 66 nearest the headliner 22. The edge portion 68 in one embodiment may have a cylindrical channel 70 formed therein for receiving the intermediate portion 18 of the elongated support member 14. The securing end 20 of the elongated support member 14 may then extend beyond the intermediate portion 18 of the elongated support member 14 and beyond the edge portion 68 of the visor 24. The securing end 20, as illustrated, is exposed, not engaged within the cylindrical channel 70 of the edge portion 68.

As show in FIGS. 2-4, the visor 24 is operable between deployed and non-deployed positions 28, 30. The visor 24 may be rotated about the intermediate portion 18 of the elongated support member 14 to transition between the deployed position 28 and the non-deployed position 30. In the non-deployed position 30, an upper surface 72 of the visor 24 may be in abutting contact with the headliner 22. Alternatively, in the deployed position 28, the visor 24 is rotated down about the intermediate portion 18 of the elongated support member 14, such that the upper surface 72 of the visor 24 may be exposed to a user sitting in the front occupant seat 48 of the vehicle 10 (FIG. 1). In the deployed position 28, the visor 24 may be used for blocking light rays from the user's field of vision. A frictional or spring biased positioning device 74 may be disposed within the rectangular shaped body 66 adjacent to the cylindrical channel 70 for engaging the elongated support member 14. The positioning device 74 allows the visor 24 to be pivoted at various angles about the intermediate portion 18 of the elongated support member 14 and to stabilize the visor 24 in such positions, including the non-deployed and deployed positions 28, 30.

Figure 5:
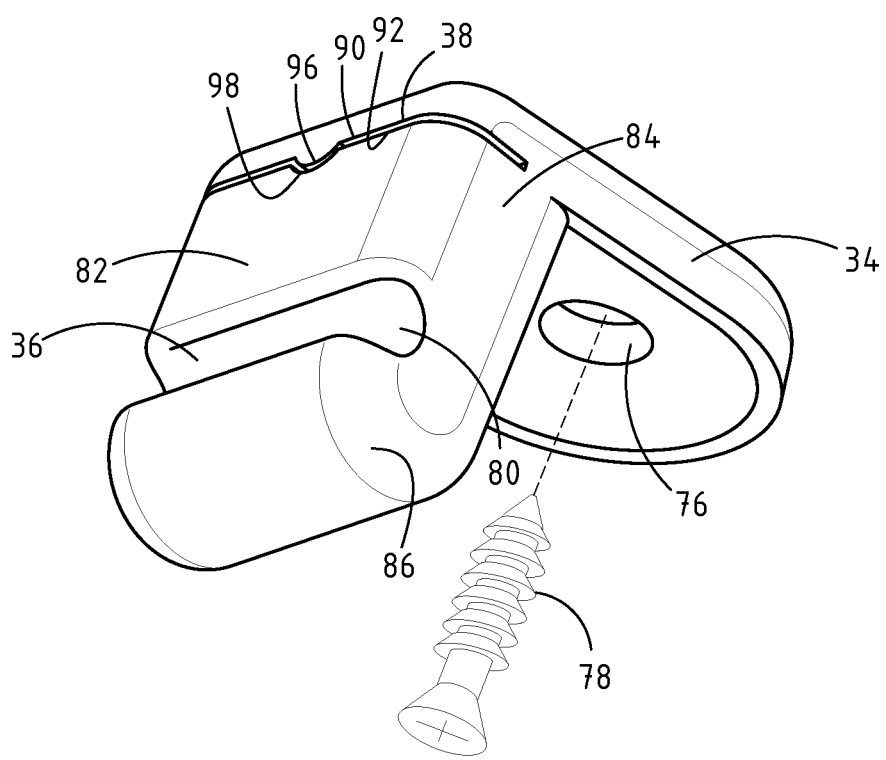
FIG. 5 is an exploded side perspective view of a check assembly of the present invention.
Figure 6:
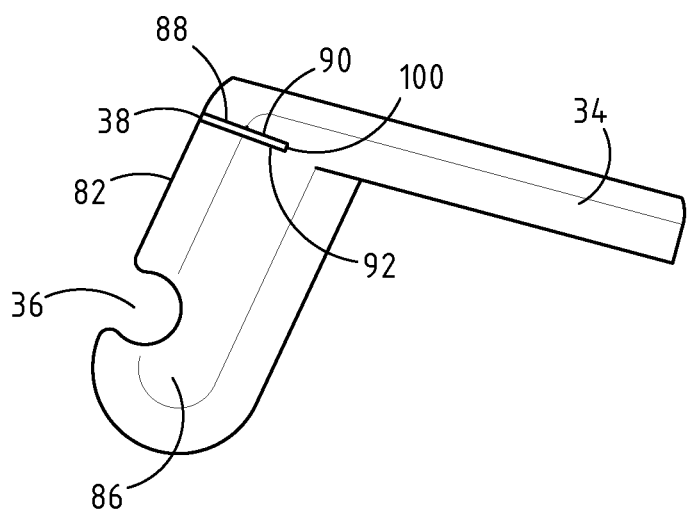
FIG. 6 is a side elevational view of a check assembly of the present invention.

Referring now to the embodiments illustrated in FIGS. 5-6, the visor assembly 12 includes the check assembly 32 that has the bracket 34 and the clip 38. The bracket 34 may be coupled with the headliner 22 of the vehicle 10, as shown in FIG. 4. The bracket 34 has an aperture 76 for receiving a fastener 78, such as a screw or a bolt. The fastener 78 couples with and extends through the aperture 76 into the headliner 22 of the vehicle 10 to fixedly secure the check assembly 32 thereto. The check assembly 32 may be secured to the general center 56 of the headliner 22, away from the outside portion 52 of the headliner 22 (FIG. 4), at a distance from the pivot end of the elongated support member 14 generally equal to a length of the intermediate portion 18 of the elongated support member 14. It is also conceived that the bracket 34 can be secured to the general center 56 of the headliner 22 by more than one fastener 78 or by other fastening mechanisms, such as forming the check assembly 32 with an integral fastener or using an adhesive between the headliner 22 and the check assembly 32.

Still referring to FIGS. 5-6, the bracket 34 also has a clasp 36 for removably engaging the securing end 20 of the elongated support member 14. The clasp 36 includes an arcuate groove 80 extending in parallel alignment with the headliner 22 of the vehicle 10 (FIG. 4A) along an upper facing surface 82 of a bracket member 84. The bracket member 84 extends orthogonally from the bracket 34 and the headliner 22 of the vehicle 10 (FIG. 4) to a rounded end 86 beyond the clasp 36. As best illustrated in FIG. 6, the arcuate groove 80 of the clasp 36 has a substantially semi-circle shaped cross-section formed to engage with a cylindrical shaped elongated support member 14. Upon engaging the securing end 20 of the elongated support member 14 with the clasp 36, the rounded end 86 of the bracket member 84 extending beyond the clasp 36 temporarily and resiliently flexes away from the vehicle roof 46, thereby expanding the opening of the arcuate groove 80 to allow the diameter of the elongated support member 14 to enter and frictionally engage with the arcuate groove 80. The securing end 20 of the elongated support member 14 may disengage from the clasp 36 and the visor 24 may be pivoted about the pivot end 16 towards the side door 54 by easy manipulation by the user, without the use of tools.

As also shown in FIGS. 5-6, one embodiment of a clip 38 is disposed on the bracket 34 to hold the small lightweight item 40 or items. In this illustrated embodiment, the clip 38 comprises a slot 88 having a first side wall 90 and a second side wall 92 that define a thickness therebetween. The slot 88 is formed along the upper facing surface 82 of the bracket member 84 in substantially parallel alignment with the arcuate groove 80 of the clasp 36, between the clasp 36 and the headliner 22. A protrusion 96 extends from the first side wall 90 toward the second side wall 92, wherein the protrusion 96 is adapted to generally secure the small lightweight item 40. The protrusion 96 has an outwardly curved arcuate surface facing the second side wall 92, and accordingly, the second side wall 92 has an indentation 98 with a recessed surface substantially aligned with the curved arcuate surface of the protrusion 96. The distance between the protrusion 96 and the indentation 98 is generally equal to the thickness of the slot 88, however, it is also conceived that such distance can vary from the thickness of the slot 88 to provide additional support in holding the small lightweight item 40. Additionally, it is understood that the thickness of the slot 88 may narrow from the upper facing surface 94 of the bracket member 84 to a bottom 100 of the slot 88, allowing the small lightweight item 40 to easily wedge between the first and second side wall 90, 92. It is also conceivable that the slot 88 may have more than one protrusion 96 extending from the first or second side wall 90, 92 toward the opposing side wall.

Figure 7:
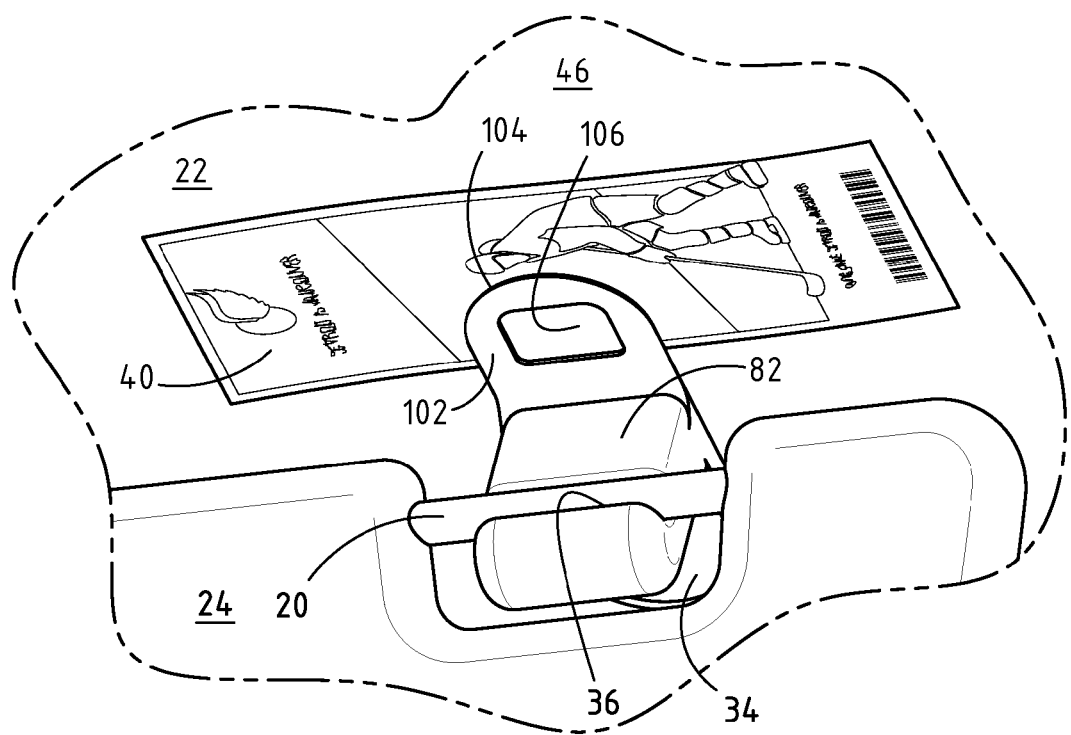
FIG. 7 is an enlarged front perspective view of another embodiment of a check assembly of the present invention in the deployed position.
Figure 7A:
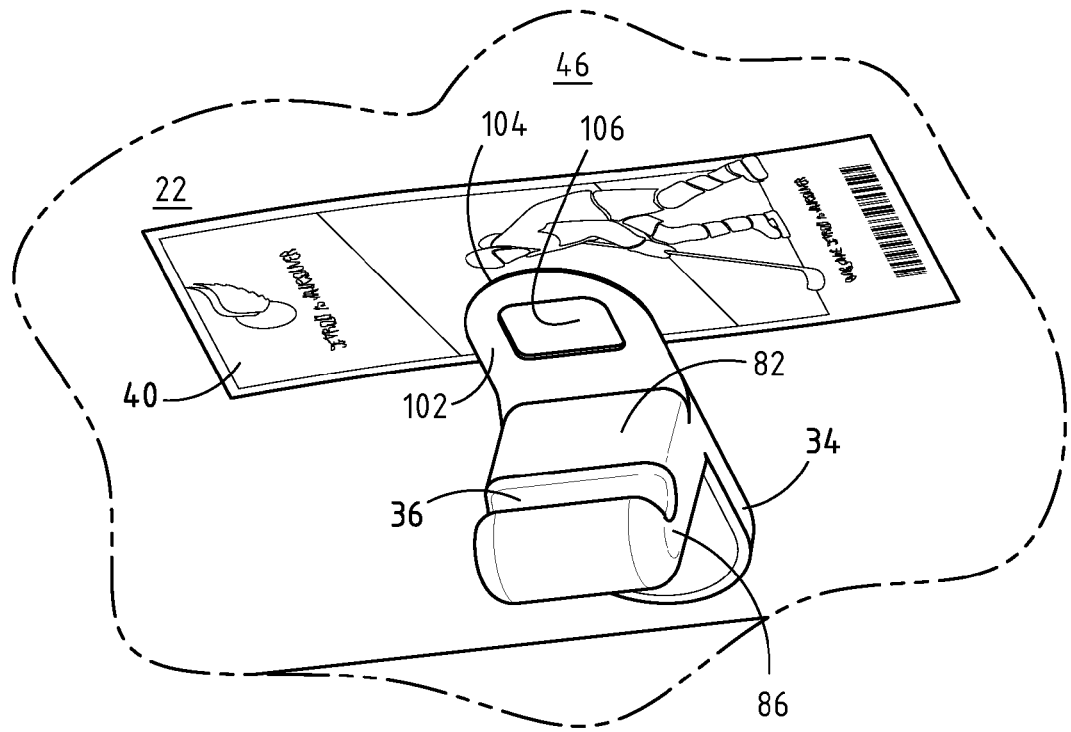
FIG. 7A is an enlarged front perspective view of the embodiment of FIG. 7 in the deployed position and detached from the check assembly.
Figure 8:
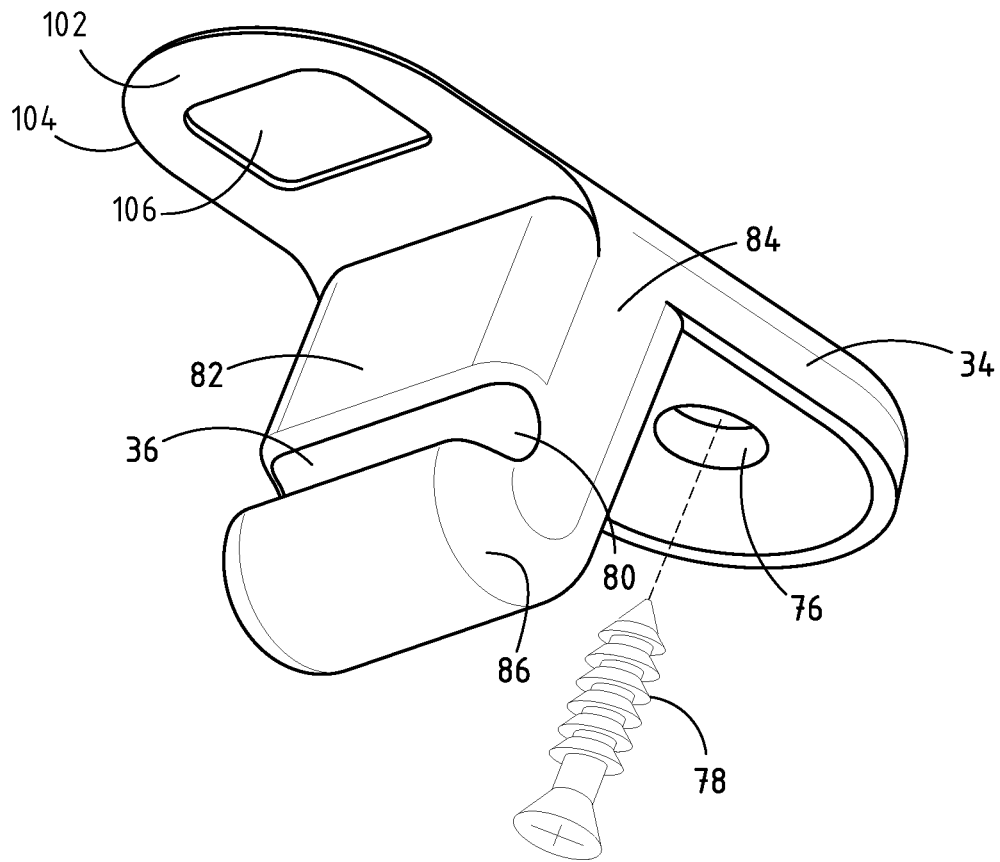
FIG. 8 is a side perspective view of the embodiment of FIG. 7.
Figure 9:
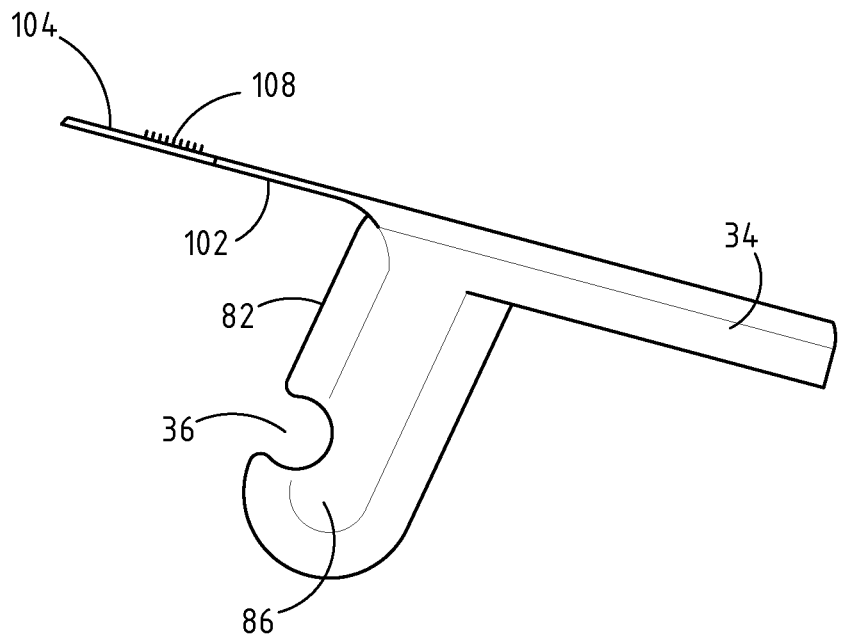
FIG. 9 is a side elevational view of the embodiment of FIG. 7.

Referring now to FIGS. 7-9, an alternative embodiment of the clip 38 on the check assembly 32 is illustrated. In such an alternative embodiment, the clip 38 comprises a tab 102 extending from the bracket 34 in general planar alignment with the headliner 22. The tab 102 includes a contact surface 104 that abuts the headliner 22 of the roof 46 and is adapted to secure the small lightweight item 40 between the contact surface 104 and the headliner 22. The tab 102 is flexibly removable from abutting contact with the headliner 22, retaining the flexed tension when the small lightweight item 40 is placed between the contact surface 104 and the headliner 22 and elastically releasing the flexed tension when the tab 102 returns to abutting contact with the headliner 22. The tab 102 has an opening 106 formed in a central portion of the tab 102, which allows a user to access and manipulate the small lightweight item 40 disposed between the contact surface 104 and the headliner 22. Further, the contact surface 104 of the tab 102 has a rough portion 108 that provides additional frictional support to the small lightweight item 40 that is disposed between the contact surface 104 and the headliner 22. Other embodiments of the clip 38, such as a spring-biased clip, a binder style clip, or another alternative embodiment of a clip 38 that is adapted to removably engage the small lightweight item 40 may be incorporated with the check assembly 32.

Referring now to an additional embodiment of the visor assembly 12, as illustrated in FIGS. 10-15. The additional embodiment includes a support member 14 pivotally supporting a visor 24 and a headliner 22 having a depressed area 110 on an interior surface 112 thereof. A check assembly 32 of the additional embodiment of the visor assembly 12 provides a body portion 114 coupled with the headliner 22 and a clasp 36 protruding downward from the body portion 114 for removably engaging the visor 24. The check assembly 32 also includes a resilient clip 116 protruding rearward from the body portion 114 over the depressed area 110 for holding a lightweight item 40 therebetween.

Figure 10:
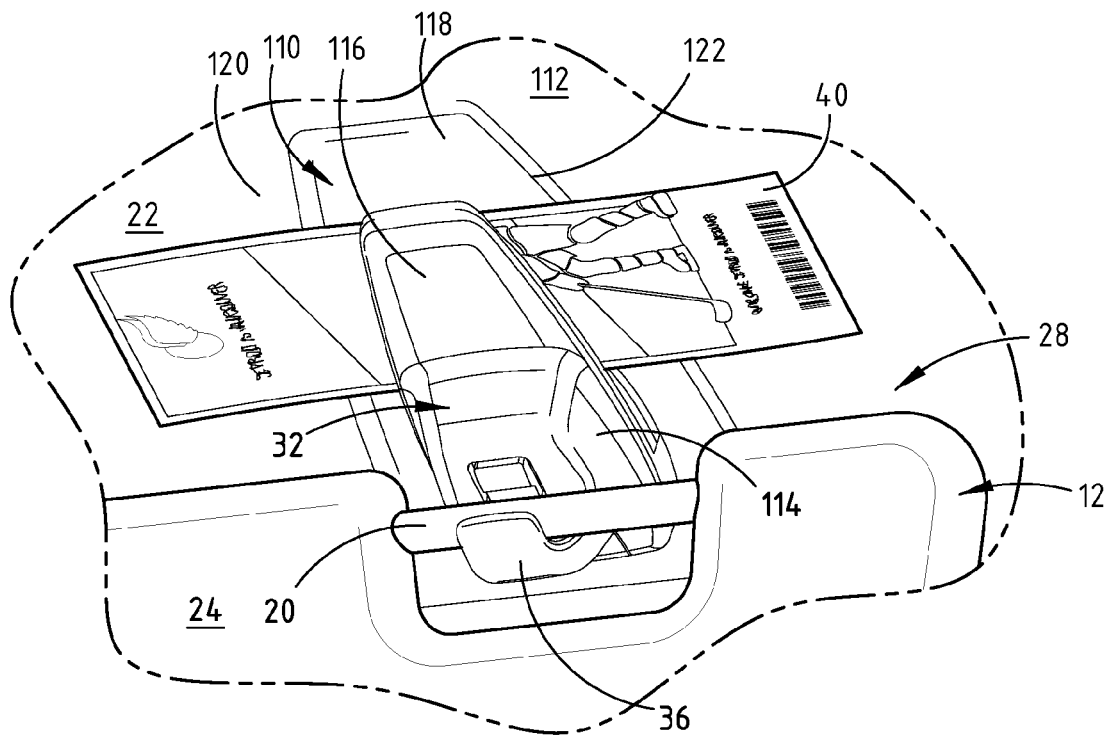
FIG. 10 is a front perspective view of an additional embodiment of a vehicle headliner and a check assembly of the visor assembly, showing the visor in the deployed position and attached to the check assembly.
Figure 10A:
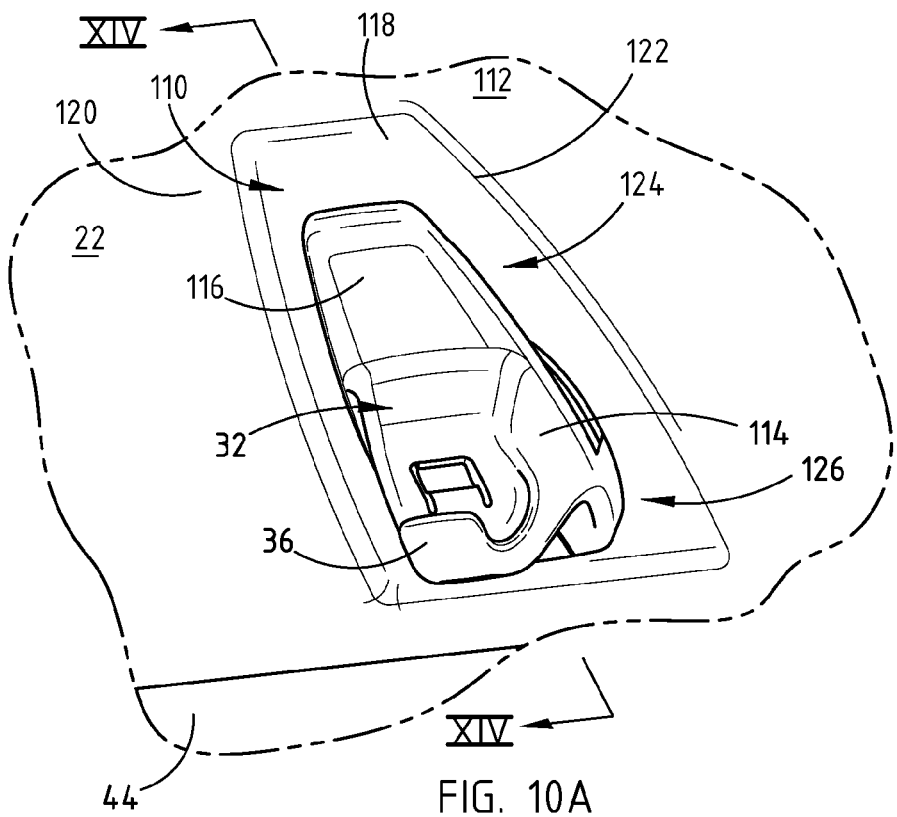
FIG. 10A is a front perspective view of the vehicle headliner and the check assembly shown in FIG. 10 with the visor detached from the check assembly.

As illustrated in FIG. 10, the additional embodiment of the visor assembly 12 is shown with the visor 24 engaged with the check assembly 32 and rotated down to the deployed position 28. As shown in FIG. 10A, the headliner 22 and the check assembly 32 are illustrated without the visor 24, such that a securing portion 20 of the visor 24 is disengaged from the check assembly 32. The securing portion 20 of the visor 24, as shown in FIG. 10, includes a generally cylindrical rod that engages the clasp 36 of the check assembly 32. It is contemplated that additional embodiments of the visor 24 may include a securing portion that is alternatively arranged to removeably engage a clasp on the check assembly and/or alternatively located on the visor 24. With respect to the general direction of the vehicle 10 (FIG. 1), located rearward from the clasp 36 on the body portion 114 of the check assembly 32, the resilient clip 116 protrudes rearward from the body portion 114 in general alignment with the headliner 22 for retaining the lightweight item 40 against the headliner 22.

With further reference to in the embodiment shown in FIGS. 10-10A, the headliner 22 includes the depressed area 119 that has a recessed surface 118 set in and upward from the interior surface 112 of the headliner 22, defining a surrounding surface 120 that borders the depressed area 110. The depressed area 110 further defines a raised edge 122 around the recessed area that has a curved shape to provide a smooth transition between the recessed surface 118 and the surrounding surface 120 in the illustrated embodiment. The raised edge 122 is shown outlining the perimeter of the check assembly 32 at a spaced distance of approximately 1-5 centimeters, and more preferably less than 3 centimeters along the longitudinally extending portions of the raised edge 122. However, as illustrated, the raised edge 122 proximate a rearward section 124 of the check assembly 32 is spaced a greater distance from the perimeter of the check assembly 32 than the raised edge 122 proximate a forward section 126 of the check assembly 32. The raised edges 122 proximate the rearward and forward sections 124, 126 are arranged laterally on the headliner in generally parallel alignment, while the raised edges 122 on the opposing sides of the resilient clips 116 extend longitudinally in substantial alignment with the outside edges of the perimeter of the check assembly 32. The depth of the depressed area in the illustrated embodiment, is generally consistent between the forward and rearward sections 124, 126 of the check assembly 32. Further, the depth is generally less than 3 centimeters, and more preferably less than 2 centimeters for the lightweight item 40 to engage between the resilient clip 116 and the headliner 22, as described in more detail herein. It is conceivable that a depth of the depressed area in alternative embodiments may vary over the depressed area 110, such as having a greater depth proximate the forward section 126 of the check assembly 32 and a lesser depth proximate the rearward section 124 of the check assembly 32.

Still referring to FIGS. 10-10A, the depressed area 110 together with the raised edges 122 on opposing lateral sides of the resilient clip 116 may be configured with the resilient clip 116 to retain the lightweight item 40 in abutting contact between the resilient clip 116 and the opposing raised edges 22. Accordingly, a lightweight item 40 comprising a substantially flat planar body may be inserted between the resilient clip 116 and the depressed area 110, which may cause the item to slightly bend in a curved formation having a center portion of the lightweight item 40 within the recessed area and the opposing ends of the lightweight item 40 curving downward away from the headliner 22 due to the abutting contact between the raised edges 22 and an exterior surface 128 (FIG. 14) of the resilient clip 116, as shown in FIG. 10. The resilient clip 116 may also flex away from the headliner 22 to allow for insertion and removal of a lightweight item 40, in addition to allowing the resilient clip 116 to retain lightweight items having greater rigidity and/or greater thicknesses than the illustrated lightweight item 40 in FIG. 10.

Figure 11:
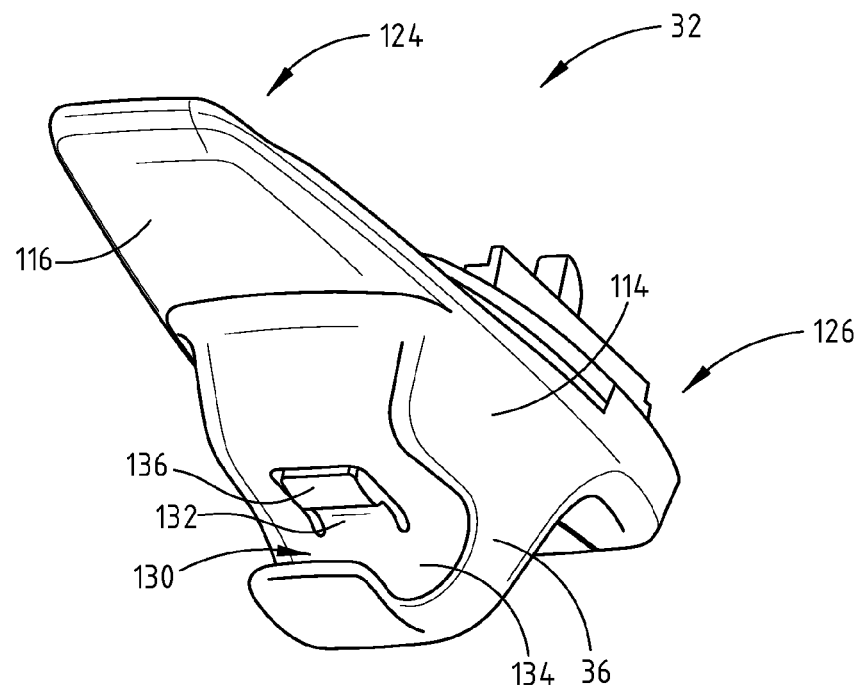
FIG. 11 is a front perspective view of the check assembly shown in FIG. 10.
Figure 12:
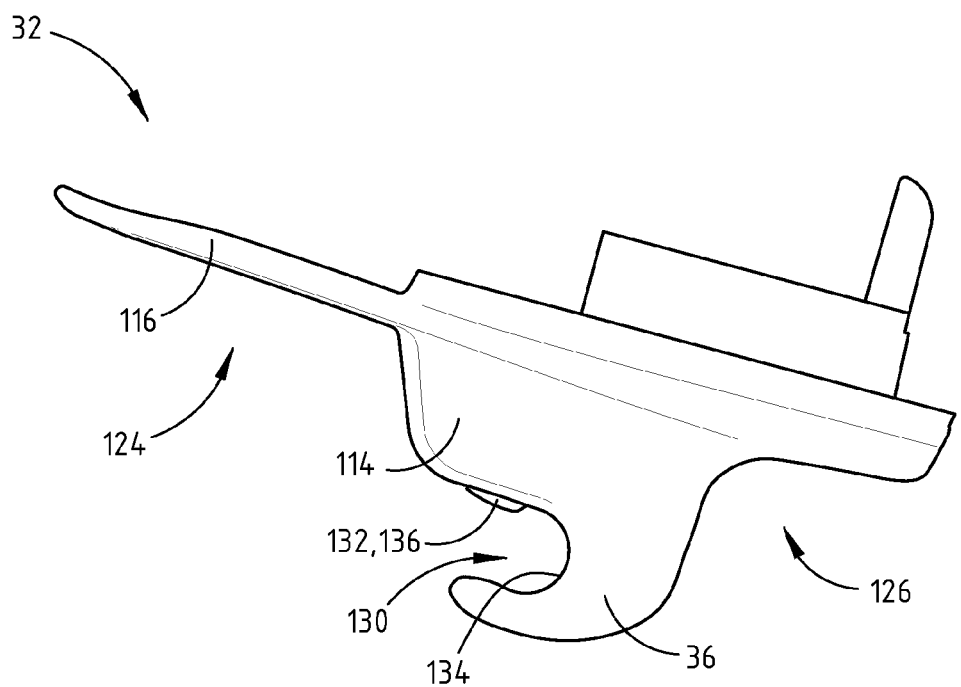
FIG. 12 is an elevated side view of the check assembly shown in FIG. 10.

As illustrated in the embodiment shown in FIGS. 11-12, the clasp 36 of the check assembly 32 protrudes downward from the body portion 114 in a hook shape that defines a channel 130 facing rearward for removably engaging the securing portion 20 of the visor 24. In the illustrated embodiment, a retention tab 132 is formed on an inside surface 134 of the channel 130 proximate the body portion 114. The retention tab 132, as shown, is integrally formed with the clasp 36 to have three free edges and one attached edge, defining a generally rectangular shape, although it is understood that the retention tab 132 may be arranged in various geometric configurations in other embodiments. Further, the retention tab 132 has a contour in general alignment with the inside surface 134 of the channel 130 aside from a protrusion 136 extending from the retention tab 132 into the channel 130. The protrusion 136 includes a receiving surface with an angle in general alignment with the body portion 114 leading into the channel 130. Also, the protrusion 135 on the retention tab 132 includes a retaining surface having a larger angle than the receiving surface that is configured to retain the securing portion 20 of the visor 24 (FIG. 10) within the clasp 36 after overcoming the receiving surface. The retention tab 132 is resiliently flexible to allow the protrusion 136 to move upward into the body portion 114 when the securing portion 20 of the visor 24 is inserted therein. The resilient flexibility of the retention tab 132 also prevents the distal end of the clasp 36 from flexing away from the headliner 22 to widen the channel 130, as previously described with reference to FIG. 6. It is contemplated that in additional embodiments, that the clasp 36 may include one or more retention tabs that may also include other resilient features or frictional retention members within the channel 130 for providing removable engageability of the visor 24 with the check assembly 32.

Figure 13:
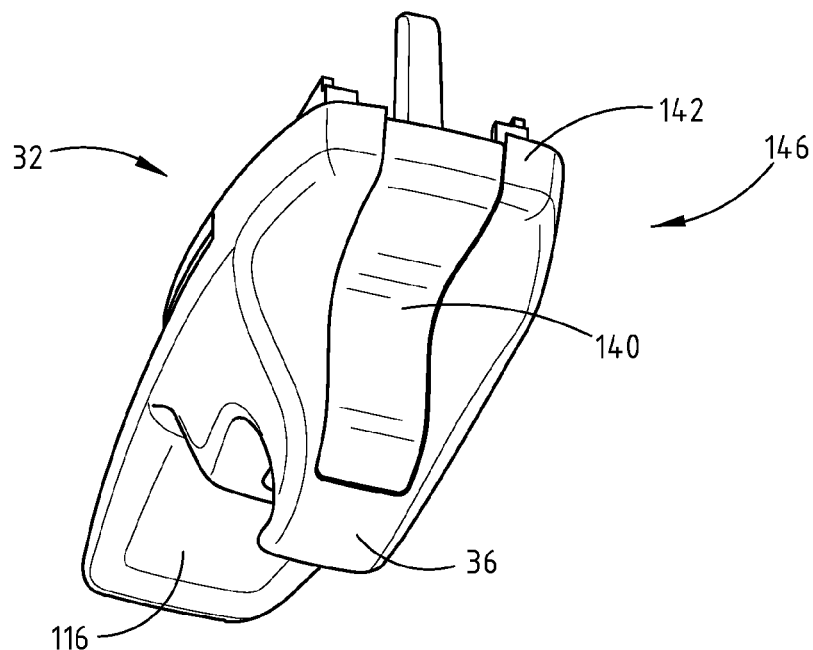
FIG. 13 is a rear perspective view of the check assembly shown in FIG. 10, showing a fastener enclosure member in a closed position.
Figure 13A:
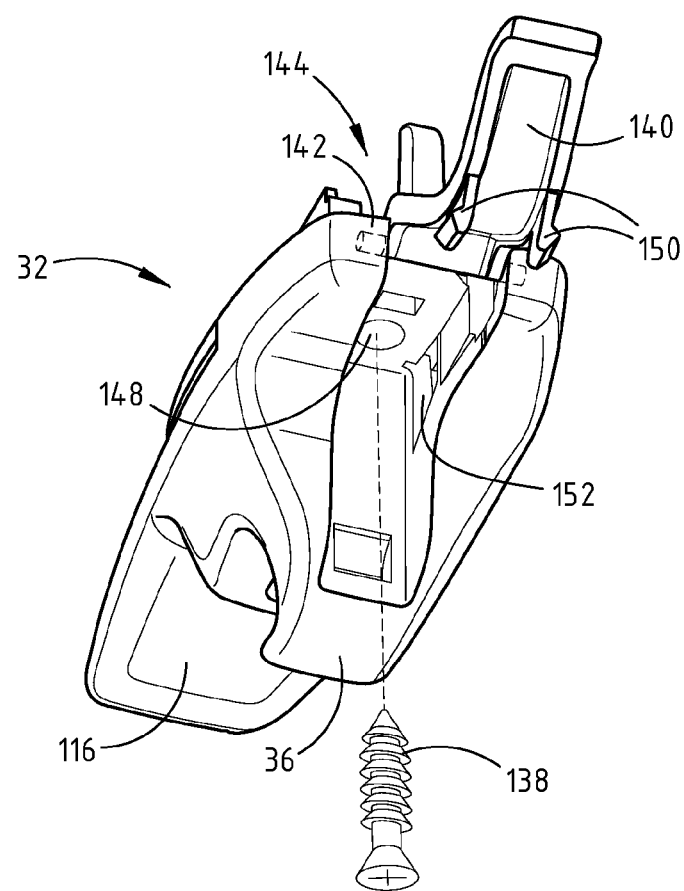
FIG. 13A is a rear perspective view of the check assembly shown in FIG. 10, showing the fastener enclosure member in an open position and a fastener for securing the check assembly to the headliner.

As illustrated in FIGS. 13-13A, the check assembly 32 includes a fastener 138 that extends through the body portion 114 forward the clasp 36 to secure the check assembly 32 to the headliner 22 (FIG. 10). Moreover, in the illustrated embodiment, an enclosure member 140 is pivotally coupled with a forward end 142 of the body portion 114 and is moveable between an open position 144 for accessing the fastener 138 and a closed position 146 for concealing the fastener 138. In the closed position 146, as shown in FIG. 13, the outer surface of the enclosure member 140 provides an aligned contour with the surrounding exterior surfaces of the body portion 114, such that a generally seamless appearance is provided to the user. In the open position 144, as shown in FIG. 13A, the enclosure member 140 is pivoted about the forward end 142 to reveal an aperture 148 extending through the body portion 114 for receiving the fastener 138. The inner surface of the enclosure member 140 includes engagement features 150 that snap fit into engagement with a corresponding opening 152 on a concealed area of the body portion 114. Upon movement of the enclosure member 140 from the open position 144 to the closed position 146, the engagement features 150 retain the enclosure member 140 in the closed position 146 to conceal the fastener 138 in the aperture 148.

Figure 14:
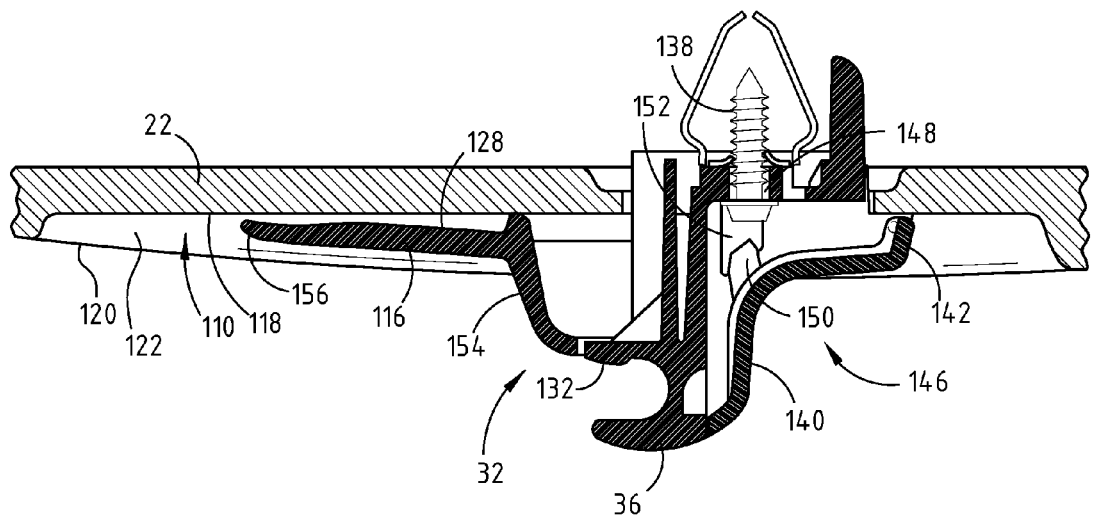
FIG. 14 is a cross-sectional side view of the headliner and the check assembly taken at line XIV-XIV of FIG. 11.
Figure 15:
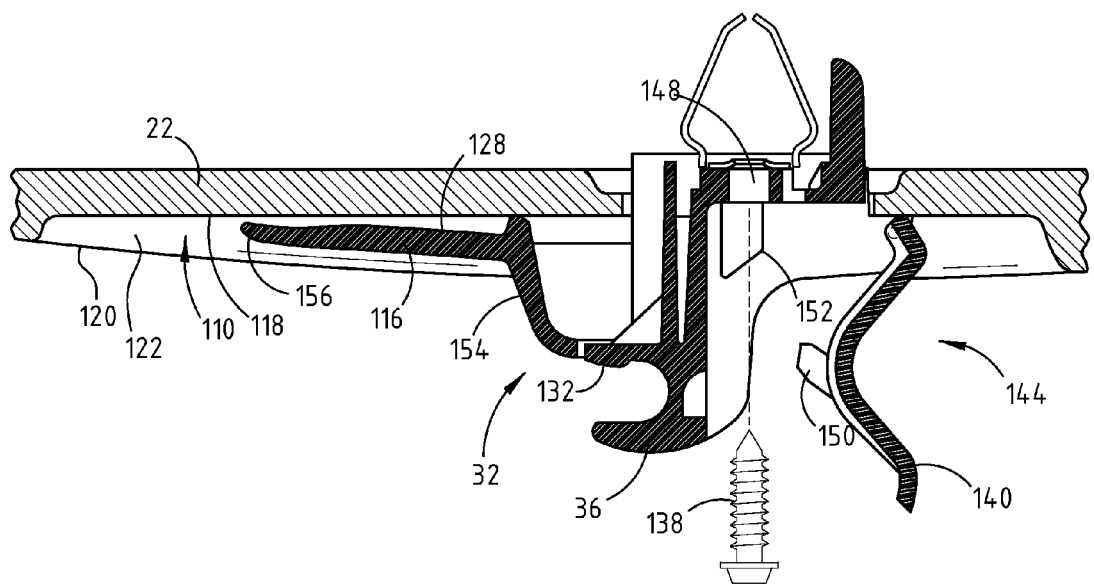
FIG. 15 is a cross-sectional side view of the headliner and the check assembly, showing the fastener enclosure member in the open position and the fastener disengaged from the check assembly.

Referring now to FIGS. 14-15, the resilient clip 116 is shown protruding longitudinally from a rear surface 154 of the body portion 114 and angling toward the recessed surface 118 of the depressed area 110. More specifically, the resilient clip 116 protrudes longitudinally from the rear surface 154 at a first location that is spaced away from the recessed surface 118 and terminates at a distal end 156, which is provided at a second location closer to the recessed surface 118 than the first location. It is conceivable that the distal end 156, in some embodiments, may be in abutting contact with the recessed surface 118, such as when an item is not secured therebetween. Further, it is also conceivable that the distal end 156 of the resilient clip 116 may be spaced away from the recessed surface 118 in a static position, such as when a lightweight item is not secured between the resilient clip 116 and the headliner 22. As also shown, an exterior surface of the body portion 114 is coupled in abutting contact with the recessed surface 118. In addition, the resilient clip 116 in the illustrated embodiment has a thickness that narrows from the body portion 114 to the distal end 156, although it is contemplated that the thickness of the resilient clip may be constant or have an alternative variation from that disclosed in alternative embodiments.

Furthermore, it is understood that in some embodiments the components of the check assembly 32, including the bracket 34, the body portion 114, the clasp 36, and the clip 38, may be integrally formed as one single piece. However, the various components of the check assembly 32 may otherwise be formed as separate pieces or multiple integral pieces. The check assembly 32 and its individual components may be made of a polymer material that provides the flexible capabilities outlined and described herein. The small lightweight item 40 that is received by the clip 38 may include a ticket, an informational item, a paper note, a plastic card, a brochure, a pamphlet, a piece of currency, a writing utensil, a pair of sunglasses, and other small lightweight items. Alternate embodiments of the clip 38 may also be utilized that are configured for securing a specific type of small lightweight item 40.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A visor assembly comprising:
   a support member pivotally supporting a visor;
   a headliner having a depressed area on an interior surface thereof; and
   a check assembly comprising:
      a body portion coupled with the headliner;
      a clasp protruding downward from the body portion for removably engaging the visor; and
      a resilient clip protruding rearward from the body portion over the depressed area for holding a lightweight item therebetween.

2. The visor assembly of claim 1, wherein the depressed area includes a recessed surface from a surrounding surface of the headliner, defining a raised edge around the recessed surface.

3. The visor assembly of claim 2, wherein the body portion is coupled with the recessed surface, such that the lightweight item is retained in abutting contact between the resilient clip and the raised edge on opposing longitudinal sides of the resilient clip.

4. The visor assembly of claim 3, wherein the resilient clip protrudes longitudinally from a rear surface of the body portion and angles toward the recessed surface.

5. The visor assembly of claim 2, wherein the resilient clip protrudes longitudinally from a rear surface of the body portion at a first location that is spaced away from the recessed surface.

6. The visor assembly of claim 5, wherein the resilient clip angles toward the recessed surface from the first location and terminates at a distal end at a second location that is closer to the recessed surface than the first location.

7. The visor assembly of claim 1, wherein the clasp protrudes from the body portion in a hook shape that defines a channel facing rearward for engaging a securing portion of the visor.

8. The visor assembly of claim 1, wherein the check assembly further comprises:
   a fastener extending through the body portion forward the clasp to secure the check assembly to the headliner; and
   an enclosure member pivotally coupled with the body portion and moveable between an open position for accessing the fastener and a closed position for concealing the fastener.

9. A visor assembly comprising:
   a support member pivotally supporting a visor;
   a recessed surface on a central region of a headliner defining opposing raised edges; and
   a check assembly comprising:
      a body portion coupled with the headliner;
      a clasp protruding from the body portion for removably engaging the visor; and
      a resilient clip protruding from a rearward section of the body portion between the opposing raised edges for holding a lightweight item therebetween.

10. The visor assembly of claim 9, wherein an exterior surface of the body portion is coupled in abutting contact with the recessed surface.

11. The visor assembly of claim 9, wherein the opposing raised edges extend longitudinally in general alignment with outside edges on opposing longitudinal sides of the resilient clip.

12. The visor assembly of claim 9, wherein the body portion, the resilient clip, and the clasp are a single integral piece, and wherein the resilient clip comprises a resilient material configured to flex the resilient clip away from the recessed surface to insert the lightweight item therebetween.

13. The visor assembly of claim 9, wherein the resilient clip protrudes longitudinally from a rear surface of the body portion at a first location that is spaced away from the recessed surface and angles toward the recessed surface terminating at a distal end at a second location that is spaced closer to the recessed surface than the first location.

14. The visor assembly of claim 13, wherein the clasp protrudes from the body portion in a hook shape that defines a channel facing rearward for engaging a securing portion of the visor.

15. The visor assembly of claim 14, wherein the check assembly further comprises:
   a fastener extending through the body portion to secure the check assembly to the headliner; and
   an enclosure member pivotally coupled with the body portion and moveable between an open position for accessing the fastener and a closed position for concealing the fastener.

16. A check assembly for a visor pivotally coupled with an outside region of a headliner, comprising:
   a body portion coupled with an inside region of the headliner;
   a clasp protruding downward from the body portion for removably engaging the visor; and a resilient clip protruding rearward from the body portion between opposing raised edges that are defined by a recessed surface on the headliner for holding a lightweight item therebetween.

17. The check assembly of claim 16, wherein the resilient clip protrudes longitudinally from a rear surface on the body portion spaced away from the headliner and terminates in substantially abutting contact with the headliner.

18. The check assembly of claim 16, wherein the resilient clip is operable to retain the light weight between an exterior surface of the resilient clip and the opposing raised edges.

19. The check assembly of claim 16, wherein the resilient clip has a thickness that narrows from the body portion to a distal end thereof.

20. The check assembly of claim 16, further comprising:
a fastener extending through the body portion to secure the check assembly to the headliner; and
an enclosure member pivotally coupled with the body portion and moveable between an open position for accessing the fastener and a closed position for concealing the fastener.

\* \* \* \* \*